O. E. CALLAWAY.
ATTACHMENT FOR BINDERS.
APPLICATION FILED NOV. 29, 1920.
1,425,365.
Patented Aug. 8, 1922.
2 SHEETS—SHEET 1.
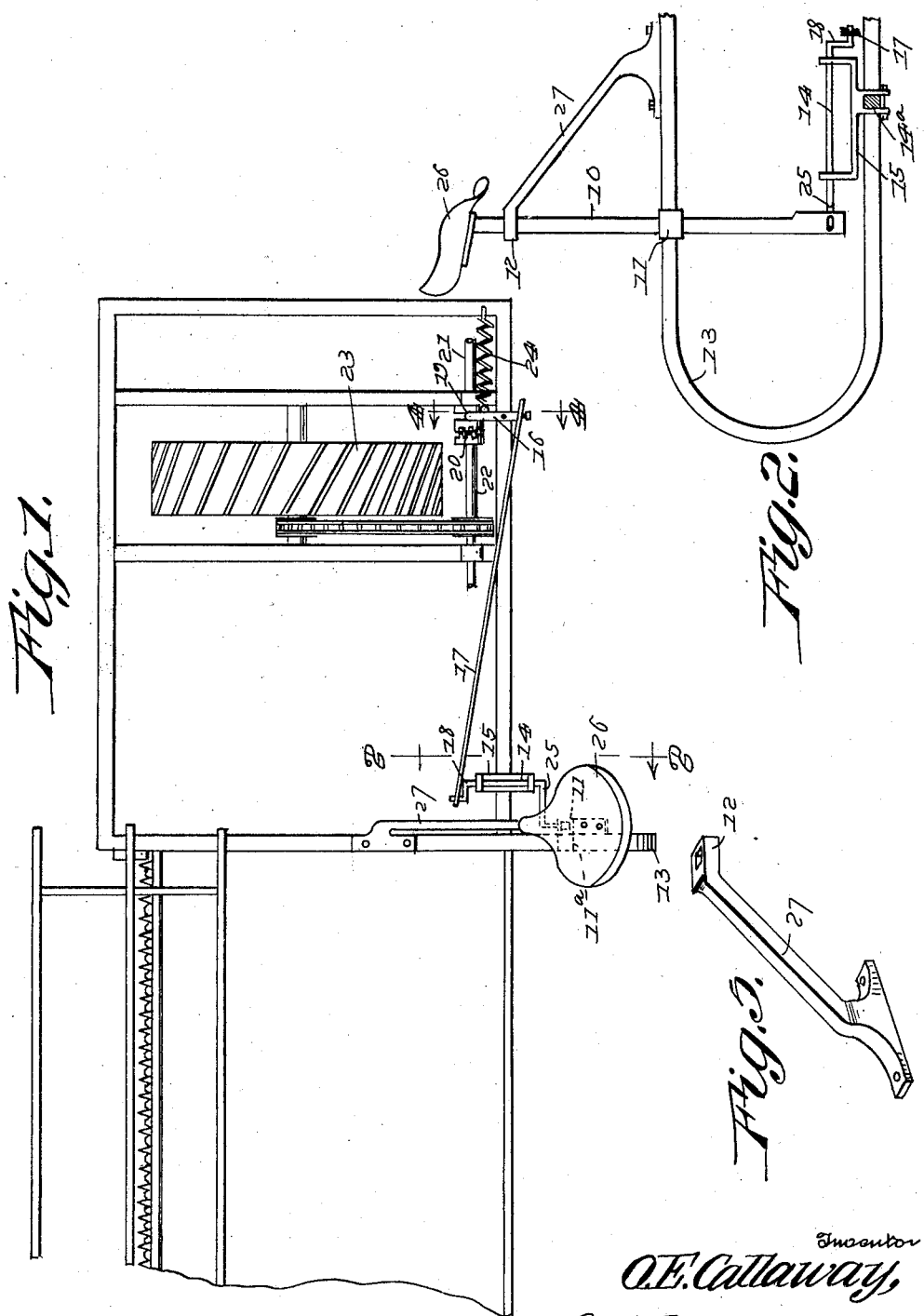

O. E. CALLAWAY.
ATTACHMENT FOR BINDERS.
APPLICATION FILED NOV. 29, 1920.
1,425,365.
Patented Aug. 8, 1922.
2 SHEETS—SHEET 2.
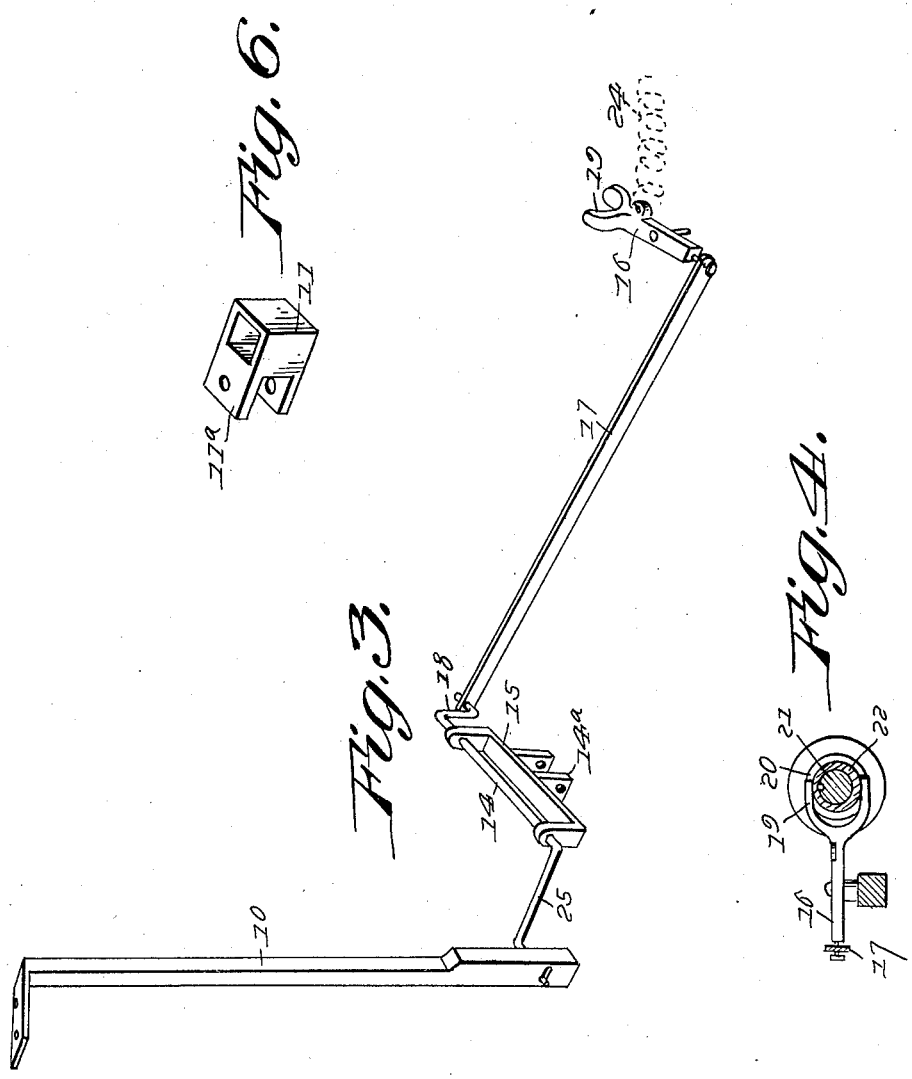

UNITED STATES PATENT OFFICE.

OSWALD E. CALLAWAY, OF DALLAS, TEXAS.

ATTACHMENT FOR BINDERS.

1,425,365.      Specification of Letters Patent.      Patented Aug. 8, 1922.

Application filed November 29, 1920. Serial No. 427,166.

*To all whom it may concern:*

Be it known that I, OSWALD E. CALLAWAY, a citizen of the United States of America, residing at Dallas, in the county of Dallas and State of Texas, have invented new and useful Improvements in Attachments for Binders, of which the following is a specification.

The object of the invention is to provide simple and efficient clutch operating or controlling means for use in connection with binders, reapers and similar agricultural machines particularly of the type employing sickles or like cutting mechanisms for the purpose of promptly interrupting the operation of the cutting mechanism in the event that the operator of the machine is thrown from the seat as occasionally happens in the operation of agricultural apparatus by reason of the severe jarring of the machine or the frightening of the team by which the same is being drawn, with the possible result that the driver is injured by being thrown into the path of the cutting mechanism before the team can be controlled; and with this object in view the invention consists in a construction and combination of parts of which a preferred embodiment is shown in the accompanying drawings, wherein:—

Figure 1 is a plan view of a clutch control mechanism embodying the invention applied in the operative position to a reaper or binder of which a conventional form is illustrated.

Figure 2 is a sectional view on the plane indicated by the line 2—2 of Figure 1.

Figure 3 is a detail view in perspective of the attachment disconnected from the machine.

Figure 4 is a detail section on the plane indicated by the line 4—4 of Figure 1.

Figures 5 and 6 are detail views respectively of the seat post brace and guide block.

The apparatus consists essentially of a vertically reciprocable seat post 10 mounted in guides 11 and 12 carried by a looped bracket arm 13 substantially connected with or forming a part of the frame of the machine, a rock shaft 14 also suitably mounted as in a bracket 15 secured to the frame of the machine, and a clutch lever 16 connected by a link 17 with said rock shaft as by a terminal crank 18 thereof, said clutch lever being forked or provided with a yoke 19 for engagement with a clutch 20 which serves to couple a driven shaft element 21 with the drive shaft 22 which receives its motion from the ground wheel 23 or any equivalent driving means. The clutch lever or clutch shifting element which obviously may be modified in construction and arrangement to adapt it to different forms of machines in connection with which the apparatus embodying the invention may be employed, is yieldingly held in its inoperative position or is impelled in a direction to disconnect the cutting mechanism from the drive shaft or operating means by a spring 24 or the equivalent thereof to the end that when released said shifting element will disconnect the cutting mechanism and interrupt the operation thereof.

The rock shaft 14 is operatively connected with the seat post by means of a crank 25 to the end that when the seat is depressed as when occupied by the driver or operator of the machine the clutch or shifting lever 16 will be moved into position to close the clutch and thus connect the cutting mechanism with the driving means, whereas upon the removal of weight from the seat which is indicated at 26 the seat post 10 will be elevated and the clutch members disconnected.

In the construction illustrated the guide 12 near the upper end of the seat post is carried by a brace 27 extending upwardly and rearwardly from the frame member 13 and the guide 11 consists of a block having ears 11$^a$, shown clearly in Figure 6 adapted to be riveted or bolted to said frame member.

The bracket 15 having the bearings in which the rock shaft 14 is mounted may also be provided with attaching ears 14$^a$ as shown in detail in Figure 3 to facilitate attachment to the frame of the machine in any desired location convenient to the position of the seat post and the clutch which is to be controlled in position by the movement of the seat post.

Having described the invention, what is claimed as new and useful is:—

In combination with an agricultural machine having a cutting mechanism and a ground wheel, means for controlling the communication of motion to the cutting mechanism and consisting of a drive shaft driven from the ground wheel, a driven shaft for connection to the cutting mechanism, a clutch operatively connecting the two shafts and having a shiftable or movable element, a vertically reciprocable post provided at its upper end with an operator's seat, a bracket mounted on the frame of the machine, a rock shaft journaled in said bracket and formed with cranks at its opposite ends of which one is pivotally connected to the lower end of the post, a clutch lever pivotally mounted on the frame of the machine and operatively connected with the movable member of the clutch, and a link having its terminals connected respectively to the clutch lever and the remaining crank of the rock shaft, whereby the reciprocation of the seat vertically may effect engagement and disengagement of the movable clutch element for the purpose specified.

In testimony whereof I affix my signature.

OSWALD E. CALLAWAY.